Figure 1:
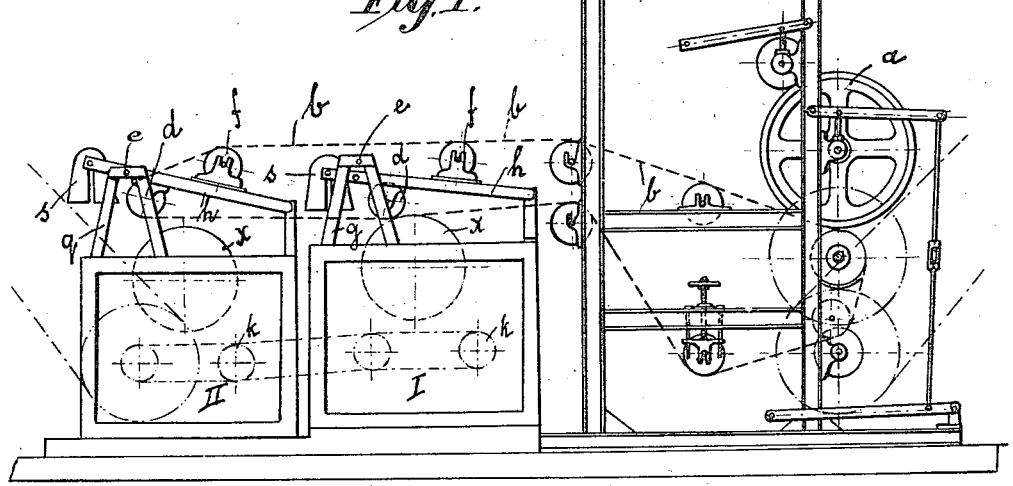

L. LUKACS.
PROCESS FOR THE MANUFACTURE OF ARTIFICIAL STONE PLATES.
APPLICATION FILED OCT. 17, 1908.

1,210,820.
Patented Jan. 2, 1917.

WITNESSES:
Rene Bruine
William F. Martinez

INVENTOR:
Ludwig Lukacs,
By Attorneys,

UNITED STATES PATENT OFFICE.

LUDWIG LUKACS, OF BUDAPEST, AUSTRIA-HUNGARY.

PROCESS FOR THE MANUFACTURE OF ARTIFICIAL-STONE PLATES.

1,210,820. Specification of Letters Patent. Patented Jan. 2, 1917.

Application filed October 17, 1908. Serial No. 458,145.

*To all whom it may concern:*

Be it known that I, LUDWIG LUKACS, a subject of the King of Hungary, residing at Budapest, Austria-Hungary, have invented certain new and useful Improvements in Processes for the Manufacture of Artificial-Stone Plates, of which the following is a specification.

This invention relates to the manufacture of artificial stone plates, and aims to provide certain improvements therein.

It has heretofore been proposed to manufacture artificial stone plates from ground fibrous material and a hydraulic binding means. One such process is described in English Patent No. 3970 of 1906, and consists in grinding asbestos or some other fibrous material and adding water until the same is in a pulpy condition. A cement or the like is also reduced to pulpy condition, and the fibrous material and cement are placed in separate receptacles, from which they are transferred to an endless belt by means of rotating drums or the like in such manner that alternate layers are built up in any desired numbers. According to this process the number of receptacles is invariably an uneven one, the object being to form the two outer layers of cement. Under these circumstances the first, third and fifth receptacles contain the cement, while the second and fourth contain the asbestos or other fibrous material. The minimum number of receptacles which are required is three, which number is usually adopted.

The present process dispenses with the use of more than two receptacles; one of such receptacles is adapted to contain the cement washed up in water, and the other the asbestos mixed with water. Preferably the process is practised in such a way that the two outer cement layers are applied to the molding cylinder (usually employed) by themselves, that is, without a layer of asbestos. This result is obtained in a simple manner by arranging the rotating drums or the like in the receptacles so that they can be disconnected.

According to the present process it is advantageous to work with less water than has heretofore been necessary, and to change the weight proportions of the cement and asbestos. Good results are obtained for instance by using 10–20 kilos of asbestos to 150–200 kilos of Portland cement, mixing such cement with 200 to 300 liters of water. The asbestos is also mixed with approximately the same quantity of water.

The preferred mode of practising the process is as follows: The cement and asbestos or other material which has been mixed with water in the above mentioned proportions, are placed in proper receptacles, each of which is provided with one or more agitators, and with a drum or screening cylinder covered with felt or the like. The agitators are then operated, and after a sufficient mixing the drum or screening cylinder arranged in the cement receptacle and the molding roll are started. The drum of the asbestos receptacle is however disconnected, so that the endless belt does not receive any asbestos. The belt therefore transmits to the molding roll only cement, in which connection it may be stated that the cement layer can be transferred to the molding roll in any desired thickness. When the cement layer has reached the desired thickness, the drum of the asbestos receptacle is then connected, so that the endless belt which is now receiving cement from the first receptacle, also receives asbestos from the drum of the second receptacle, and both of these layers are accordingly transferred to the molding cylinder by the belt. After a suitable number of cement and asbestos layers have been applied to the cylinder, the asbestos receptacle is again disconnected, so that a layer of cement only is transferred to the molding cylinder. This exterior layer of cement may be of any desired thickness. The plate taken off from the molding cylinder may be pressed, worked and finished in any well known manner. If colored plates are required, a coloring matter may be added to the asbestos or the cement.

The improved process described has the advantage that it requires smaller mechanism than the processes heretofore practised, that the formation of the layers of the product takes place with great certainty, that the consumption of water is decreased, and that the impermeability and solidity of the finished product can be increased as the two outer layers of cement can be formed of any desired thickness. The process can for example be carried out with the apparatus schematically shown in the drawing herewith, in which,—

Figure 2:
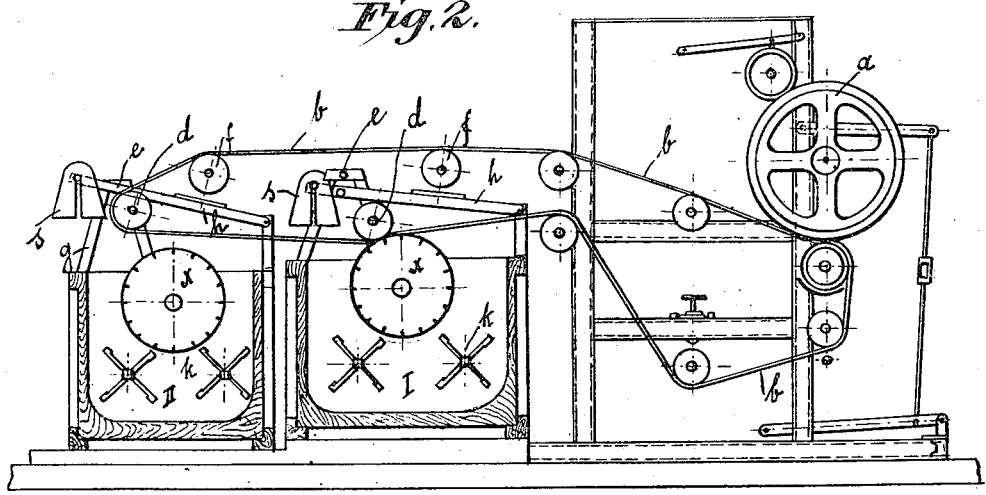

Figure 1 is a front view. Fig. 2 a section of the apparatus employed.

The properly spread cement paste will be introduced for example into the vessel I and the asbestos deposited with water in the vessel II. Both vessels are provided with agitator $k$ and drums $x$. The drum of the cement vessel is preferably overlaid with felt, while the asbestos vessel is provided with the sieve drum. The stripping of the drum of the asbestos vessel happens in this way,—the arm $h$ which carries the weight $s$ is fastened by pin $e$ to the frame $g$ whereby the endless band $b$ does not come into contact with the drum $x$ of the asbestos vessel (in the drawing the vessel II) so that the endless band $b$ takes up no asbestos. If now the pin $e$ is withdrawn the arm $h$ falls down, the roller $d$ consequently presses by means of the weight $s$ the endless band $b$ on to the drum $x$ (in the drawing the vessel I), so that from the vessel cement or asbestos as the case may be is applied to the endless band. The receiver or forming roll which receives the cement or asbestos layer is shown at $a$.

While I have described in detail one form of the invention, I do not wish to be limited thereto, as variations may be made therein without departing from the invention.

What I claim is:—

A process of manufacturing artificial stone composed of layers of asbestos and cement, the outside layers being of cement, consisting in delivering onto an endless belt, at an initial stage, a single layer of cement, transferring said layer onto a drum, simultaneously delivering onto the endless belt, at another stage, two layers, one a layer of cement, and the other a layer of asbestos, one being superposed on the other, transferring said superposed layers onto said drum, and delivering onto the endless belt, at a final stage, a single layer of cement, and transferring said layer of cement onto said drum.

In witness whereof, I have hereunto signed my name in the presence of two subscribing witnesses.

LUDWIG LUKÁCS.

Witnesses:
St. James Intain,
Michael Albinos.